United States Patent [19]

Iwata et al.

[11] 3,953,864
[45] Apr. 27, 1976

[54] CAMERA DEVICE HAVING A PHOTOGRAPHIC FLASH DEVICE COMBINED THEREWITH

[75] Inventors: Hiroshi Iwata, Osaka; Satoru Misaki, Toyonaka, both of Japan

[73] Assignee: West Electric Company, Ltd., Osaka, Japan

[22] Filed: Oct. 23, 1973

[21] Appl. No.: 408,530

[30] Foreign Application Priority Data
Oct. 23, 1972 Japan.............................. 47-106502
Mar. 20, 1973 Japan.............................. 48-32332

[52] U.S. Cl.................................. 354/27; 354/33; 354/60 F; 354/139; 354/145; 354/149
[51] Int. Cl.²......................................... G03B 7/16
[58] Field of Search ............... 354/27, 33, 145, 149, 354/32, 60 F, 139

[56] References Cited
UNITED STATES PATENTS
3,654,843   4/1972   Veda et al. ........................ 354/145

Primary Examiner—L. T. Hix
Assistant Examiner—Russell E. Adams, Jr.
Attorney, Agent, or Firm—Stevens, Davis, Miller & Mosher

[57] ABSTRACT

A combination of a camera device and an electronic flash device in which not only switching between the natural light mode and electronic flash mode but also the exposure control are automatically effected depending on the sensitivity of the film and the brightness of the object to be photographed. Said combination comprises means for connecting the electronic flash device to an electric power source only when the former satisfies an optimal condition of use for avoiding the loss of electric energy and does not open the shutter of the camera device when the electronic flash device does not meet the optimal conditions of use for preventing mis-operation thereof.

6 Claims, 3 Drawing Figures

CAMERA DEVICE HAVING A PHOTOGRAPHIC FLASH DEVICE COMBINED THEREWITH

This invention relates to a combination of a camera device and an electronic flash device in which not only switching between the natural light or daylight mode and electronic flash mode but also exposure control are automatically effected depending on the sensitivity of the film and the brightness of the object to be photographed.

In a prior art camera device including a diaphragm means, a warning signal is usually displayed when, as the brightness of an object is decreased below a definite level, the intensity of illumination incident on a photoconductive element is lowered causing the shutter speed to be decreased. A warning signal is also displayed if the camera is shaken in the operator's hand during exposure is so as to cause the finished photographs to be blurred. The operator, in accordance with the warning, either sets a flash device or prepares a tripod or the like so that the camera may be prevented from shaking during a long exposure. In this way, the object may be clearly photographed at a low level of brightness.

In practice, however, the operator is, in response to the warning signal display, required to set the flash device, connect an electric power source, confirm that a storage capacitor has been changed to a predetermined value by observing a neon tube or the like provided in the flash device, fire the flash device and finally disconnect the electric source. This series of procedures is quite troublesome and, in fact, various mis-operations are sometimes brought about.

On the other hand, the flash device is limited in its capacity by another factor; that is, the distance between the camera and the object is limited within a suitable range determined by the sensitivity of the film charged in the camera and the luminous intensity of the flash device. Accordingly, generally in the prior art camera device, a focus adjusting movable ring is interlocked with the diaphragm means so that the movable ring may be mechanically moved only within but not outside the suitable range with respect to the flash device and the film, thereby preventing unsuitable exposure by the flash device.

Such a process, however, may disadvantageously result in an unsuitable exposure being obtained because the movable part of the focus adjusting ring is only stopped at the ends of the suitable range of exposure and, when the shutter button is pushed, the shutter is opened causing, at the same time, the flash device to be fired even ouside of the suitable range of exposure.

An object of this invention is to eliminate the above-mentioned disadvantages and to provide a combination of a camera device and a photographic flash device. The combination comprises a mis-operation prevention circuit which co-operates with a warning circuit to determine the need for flash mode photography, and such is the case, to detect whether the object is in the available range of the flash device or not. The device further closes or opens as required the connection between the flash device and an electric source so that the flash device is not be required at all times to in operation and the shutter of the camera device may be prevented from opening except under a predetermined condition.

In accordance with this invention, there is provided a camera device having a photographic flash device combined therewith which is of practical value in that a high degree of reliability in flash mode photography is assured by combining a camera device and a photographic flash device.

These and other objects, features and advantages of the present invention will be apparent from the following description taken in conjunction with the accompanying drawings, in which.

Now, this invention will be described in detail with respect to the embodiments.

Figure 1:
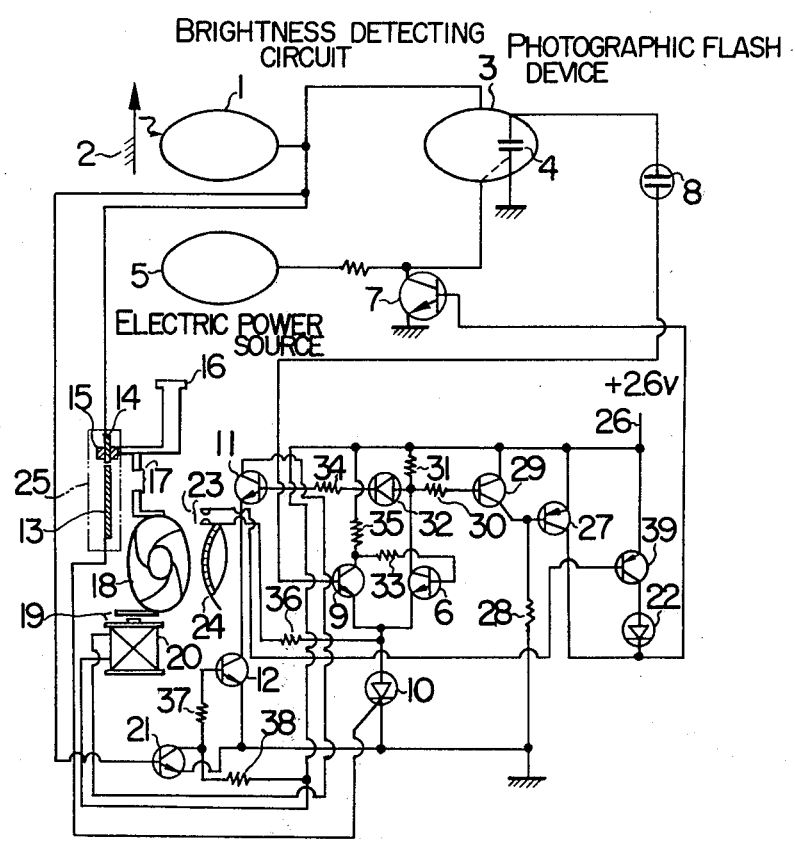
FIG. 1 is an electric circuit diagram showing an embodiment of a camera device according to this invention.

In FIG. 1, numeral 1 designates a brightness detecting circuit comprising a photo-sensitive element for detecting the brightness of an object 2. When the brightness of the object 2 is more than a predetermined value, no flash device is necessary and, in this case, the brightness detecting circuit 1 does not generate any signal; that is, the object 2 is photographed in the natural light or daylight mode.

When the brightness of the object 2 is less than the predetermined value, the brightness detecting circuit 1 generates a signal. In particular, when a shutter button 16 is pushed, the signal from the brightness detecting circuit 1 is supplied through a switch 25 to a gate of a thyristor 10 to make the thyristor conductive. The switch 25 is interlocked with the shutter button 16 and comprises fixed contacts 13 and 15 and a slidable contact 14.

On the other hand, switch 23 is adapted to be short-circuited when the object 2 is outside the available range of a photographic flash device 3 which is interlocked with a focus adjusting ring 24. The switch 23 operates as follows. When the object 2 is within the available range of the photographic flash device 3, that is, the switch 23 is opened, a transistor 6 together with the thyristor 10 is made conductive by the signal from the brightness detecting circuit 1 and further a transistor 29 is also then made conductive through a resistor 30.

Consequently, the base and emitter of a transistor 27 are short-circuited by the transistor 29 and the transistor 27 whose base current has been passed through a resistor 28 is made non-conductive; that is, it no longer supplies any current to the base circuit of a switching transistor 7. As a result, the switching transistor 7 becomes nonconductive and the photographic flash device 3 is supplied with electric power from an electric source 5 causing a storage capacitor 4 of the flash device 3 to be charged.

Whereas, when the object is outside the available range of the flash device 3, that is, the switch 23 is short-circuited, a transistor 39 is made conductive by a base resistor 36, the switch 23 and the thyristor 10, causing the base circuit of the switching transistor 7 to be short-circuited through a luminous display element 22 thereby rendering the transistor 7 conductive. As a result, the electric power source 5 does not supply power to the flash device 3 because of the by-pass circuit through transistor 7 and the flash device 3 is not activated.

In this case, warning is given by means of the luminous display element 22 that the object 2 is outside the available range of the photographic flash device 3, and, at the same time, a cut-off state is realized in which an electromagnet 20 connected with the collector side of a transistor 11 has no current flowing therethrough, because the transistor 6 and the thyristor 10 are conductive and so the base circuit of the transistor 11 is short-circuited by the transistor 6, thyristor 10, and further a transistor 12 being made conductive by resistors 38 and 37.

Now, for convenience of description, the manner of operation of a shutter 18 is in the embodiment as shown in FIG. 1 will be described.

a. When the electromagnet 20 is not activated, a shutter-closing means 19 does not operate. Consequently, even if a shutter-opening means 17 of the shutter 18 is pushed together with the shutter button 16, the shutter 18 does not open. That is, the pushing operation is ineffective.

b. When the electromagnet 20 is activated, the shutter-closing means 19 operates. Consequently, the opening means (17) is operated by pushing the shutter button 16 causing the shutter 18 to be opened.

c. After the operation as described in (b), when the electromagnet 20 has finished being activated while the shutter 18 is being opened, the shutter 18 closes under the spring force of the shutter blades.

Since the shutter behaves just as described above, when the object is outside the available range of the flash device 3, the electromagnet 20 is in the state of cut-off and so the shutter 18 behaves as described in (a); that is, pushing the button is ineffective for opening the shutter 18. As a result, safety is assured doubly, together with the warning display as described earlier.

Next, when the object is within the available range of the flash device 3, the storage capacitor 4 in the flash device 3 begins to charge.

If a control element 8 such as a neon tube is adjusted to discharge at a predetermined voltage of the storage capacitor 4, a transistor 9 is supplied with base current causing it to conduct as the control element 8 becomes conductive, while the transistor 6 having been conductive is made non-conductive because the base and emitter are then shortcircuited through a resistor 33. Consequently, the base current of the transistor 11 flows through a resistor 31, a diode 32, a resistor 34, and a transistor 12, transistor 12 being conductive through the resistors 37 and 38, to activate the electromagnet 20 which is a load of the transistor 11. This causes the shutter 18 to behave as described in (b); that is, to be capable of opening.

When a predetermined opened time interval of the shutter 18 has passed, the brightness detecting circuit 1 feeds a flash signal to the photographic flash device 3 and, at the same time supplies a shutter closing signal to a transistor 21. As a result, the transistor 12, which has been conductive, is short-circuited between the base and emitter to become non-conductive and the shutter 18 is closed by the operation as described in (c).

As described above, since, according to this invention, it is detected previously whether the object is within the available range of the photographic flash device or not and the electric source of the flash device is closed or opened depending on the above detection, the flash device is not required at all times to be actuated and the loss of energy is eliminated. Further, since the shutter is opened in co-operation with the warning circuit by pushing the shutter button and pushing the button is effective only when opening is necessary, mis-operation can be effectively prevented.

Figure 2:
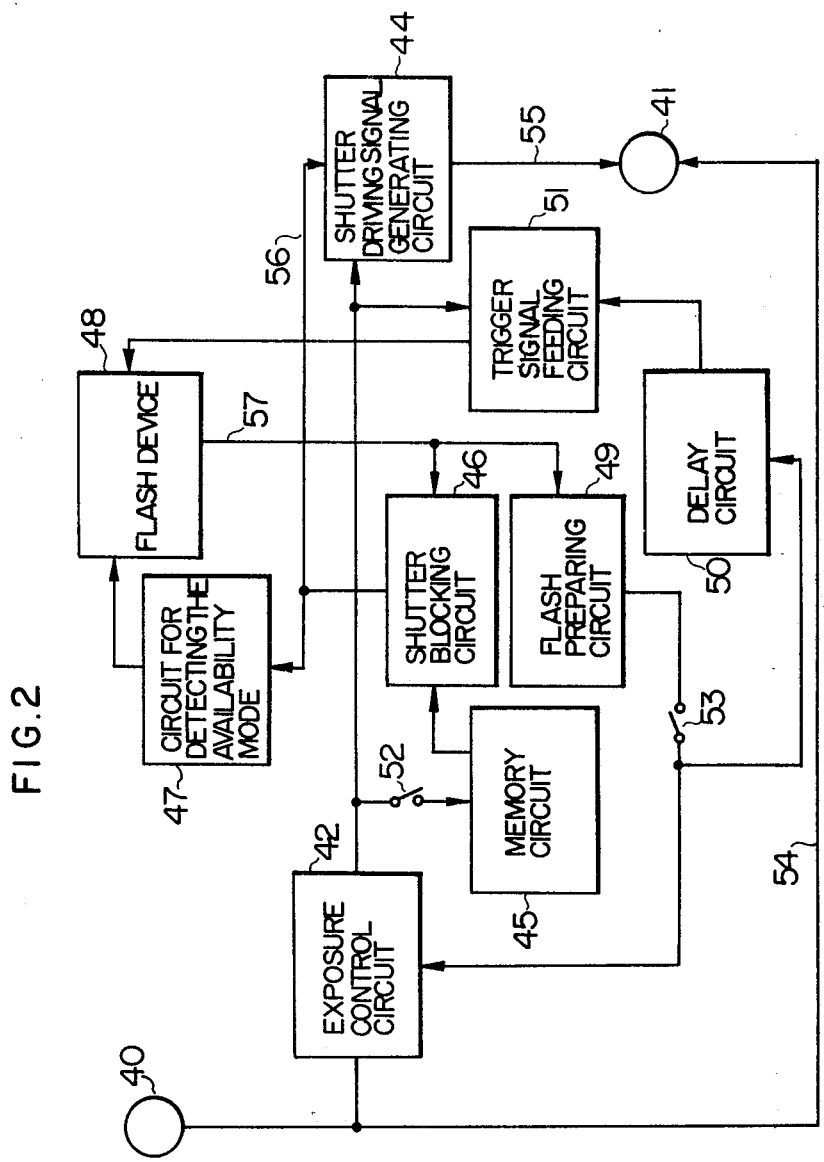
FIG. 2 is a block diagram showing another embodiment according to this invention.

FIG. 2 is a block diagram showing another embodiment of this invention. In FIG. 2, when a shutter button 40 is pushed, an exposure control circuit 42 comprising a brightness detecting circuit and a shutter aperture control circuit is operated. When the brightness of an object is more than a predetermined value, the brightness detecting circuit operates in such a manner that the object is photographed in a natural light or daylight mode as will be described hereinafter, while, when the brightness of the object is less than the predetermined value, the brightness detecting circuit selects photography in the flash mode. First, photography in the natural light mode will be described.

1. When the shutter button 40 is pushed, the brightness detecting circuit included in the exposure control circuit 42 generates a signal which is fed to a shutter driving signal generating circuit 44.

2. The shutter driving signal generating circuit 44 supplies an opening preparing signal 55 to a shutter blocking means which is included in a shutter mechanism 41 comprising solenoids and the like and, as a result, the shutter mechanism is kept in a state of being ready for opening.

3. When the shutter button 40 is fully depressed, the shutter is opened and, at the same time, the shutter aperture control circuit included in the exposure control circuit 42 begins to integrate the brightness of the object. When the integrated brightness reaches a predetermined value, the shutter aperture control circuit generates and feeds a signal to the shutter driving signal generating circuit 44 for closing the shutter. The photography in natural light mode is thus completed. Next, the photography in the flash mode will be described.

1. When a switch 52 is switched by further pushing the shutter button 40, a memory circuit 45, a shutter blocking circuit 46 and a circuit for detecting the availability of flash mode 47 are successively operated and, only if the object is within the available range of the flash device, an electric source to a convertor circuit included in a flash device 48 is switched in causing a storage capacitor to begin charging.

2. On the other hand, the shutter blocking circuit 46 supplies a shutter blocking signal 56 to the shutter driving signal generating circuit 44 so that, even if the shutter button 40 is fully depressed the shutter of the shutter mechanism 41 may not be opened until the flash device 48 is ready to flash.

3. Next, when the flash device 48 reaches a state which can supply a predetermined luminous intensity, the flash device 48 feeds a charging finishing signal 57 to operate a flash preparing circuit 49.

4. Next, when a switch 53 adapted to be interlocked with a shutter release is turned on, an operation signal is supplied from the flash preparing circuit 49 to the shutter aperture control circuit in the exposure control circuit 42 and, as soon as the shutter aperture control circuit becomes operable, a signal is supplied from the flash preparing circuit 49 to a delay circuit 50 causing further a trigger signal feeding circuit 51 to be operable.

5. When, in this condition, the shutter button 40 is fully depressed a mechanical opening signal 54 being interlocked with the shutter button 40 is provided causing the shutter of the shutter mechanism 41 to begin opening. At the same time, the aperture control circuit in the exposure control circuit 42 operates and, when a suitable flash time corresponding to the distance to the object has come, the output from the exposure control circuit 42 is fed not only to the trigger signal feeding circuit 51 causing the flash device 48 to be fired but also to the shutter driving signal generating circuit 44 causing the shutter opening preparing signal 55 to be cut and, as a result, the shutter of the shutter mechanism 41 to be closed. In this case, since closing the shutter has a longer delay owing to mechanical response them the flashing time interval of the flash device 48, the shutter of the shutter mechanism 41 is closed after the flash device 48 has completely finished flashing.

Hereinbefore, the photography operation has been described with respect to both the natural light mode and the flash mode. It is noticed in particular that, in the case of the flash mode, when, for example, the object is outside the available range of the flash device 48 because of the device 48 being limited in its luminous intensity, a charging beginning signal to a converter circuit in the flash device 48 is cut by the circuit for detecting the availability of the flash mode 47 causing the shutter of the shutter mechanism 41 to be kept closed; as a result, photography is then impossible and no failure in flash mode photography can be brought about.

Figure 3:
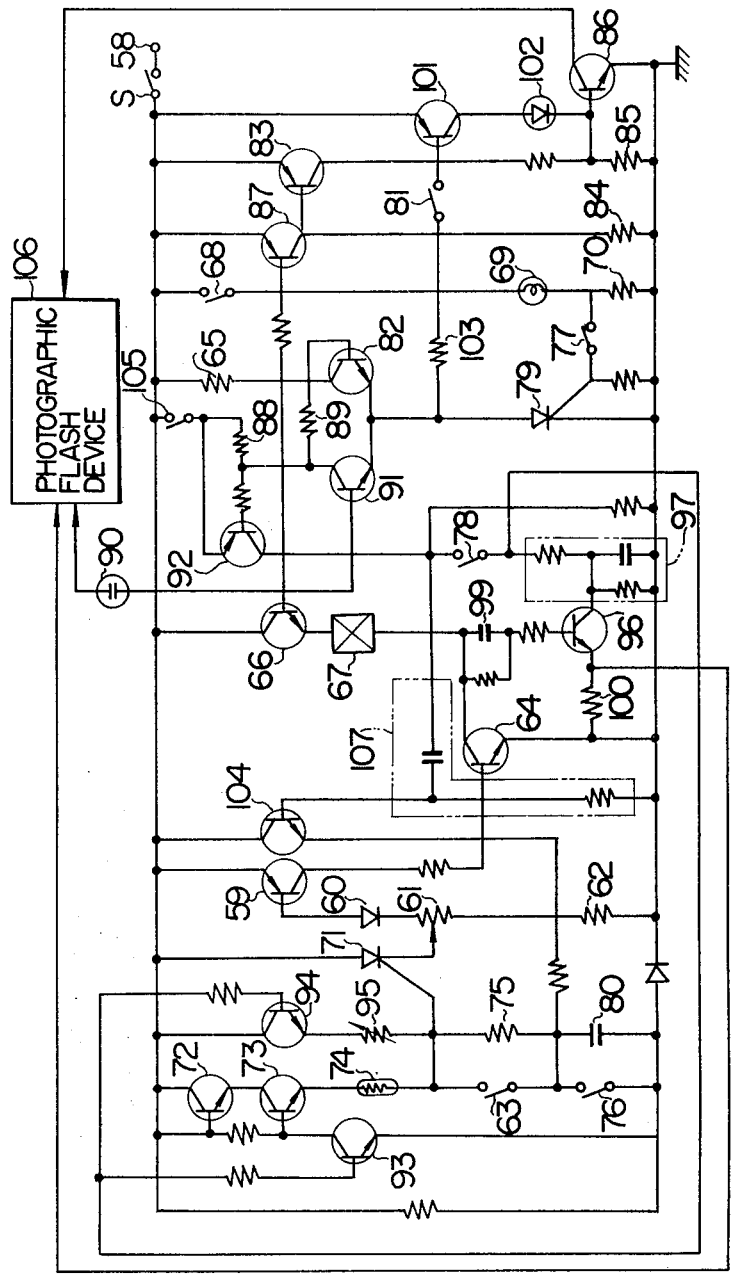
FIG. 3 is an electric circuit diagram showing circuit details of the embodiment shown in FIG. 2.

FIG. 3 shows circuit details of the embodiment shown in FIG. 2. In FIG. 3, when a switch S is turned on by depressing the shutter button (not shown in FIG. 3) and an electric power source 58 is connected, a transistor 59 becomes conductive as a result of its base current flowing through a diode 60, a variable resistor 61 and a resistor 62. Further, a transistor 64 associated with the transistor 59 and a transistor 66 having its base current flowing through a resistor 65 are successively made conductive and, finally, an electromagnet 67 is activated so that the contact 68 is short-circuited.

This series of operations can be used to judge the quality of source batteries. That is, if the critical operation of the electromagnet 67 is adopted as a judging standard, source batteries of good quality make the electromagnet 67 short-circuit the contact 68 thereby causing a display lamp 69 connected in series with a resistor 70 to be turned on while those of bad quality do not cause the display lamp 69 to be turned on.

When, after the quality of the source batteries is tested as described above, the shutter button is further depressed, a switch 63 having been closed is opened so that a control element 71 such as a thyristor (hereinafter referred to as a thyristor) having been non-conductive is supplied with a signal for selecting and indicating either natural light mode photography or flash mode photography. That is, to the gate of the thyristor 71 is applied the change in voltage drop across a resistor 75 through transistors 72 and 73 being conductive, depending on the change in a photoconductive element 74 corresponding to the brightness of an object.

Now, assume that the brightness of the object is suitable for natural light mode photography. Then, since light incident on the photoconductive element 74 is intense enough for the corresponding voltage to be higher than the threshold voltage of the thyristor 71, the thyristor 71 becomes conductive and the transistor 59 becomes non-conductive because of its base circuit being short-circuited whereby the transistors 64 and 66 which have been conductive become non-conductive. As a result, the contact 68 of the magnet 67 is opened causing the display lamp 69 to be "off" to display the natural light mode. Next, assume that the brightness of the object is suitable for flash mode photography. Since, in this case, light incident on the photoconductive element 74 is not intense enough to make the thyristor 71 conductive, the transistors 59, 64 and 66 remain conductive and the electromagnet 67 keeps the same state as when the source batteries were tested. Consequently, the display lamp 69 continues to be "on" to display the flash mode.

When the shutter button is further depressed with the natural light mode displayed, a switch 77 is closed and then opened again and the terminal voltage of the resistor 70 is applied to a control element 79 such as a thyristor (hereinafter referred to as a thyristor). Since, as described above, the contact 68 is opened in natural light mode photography, the thyristor 79 does not operate and the function of natural light mode photography is selected.

When, after the above-described operation, the shutter button is further depressed to close the switch 63 again, the thyristor 71 having been conductive is reversed to be non-conductive and the transistors 59, 64 and 66 become conductive causing the electromagnet 67 to be in the state of operation; that is, the shutter of the shutter mechanism is in the state of being ready for opening. And, when the shutter button is further depressed to the lowermost position thereby to close a switch 78 while opening a switch 76 and the shutter of the shutter mechanism begins to open, a capacitor 80 begins to charge so that suitable exposure corresponding to the brightness of the object may be given to a film. And when, after a predetermined period of time corresponding to the suitable exposure, the charged voltage reaches the threshold voltage of the thyristor 71, the thyristor 71 becomes conductive while the transistors 59, 64 and 66 become non-conductive and, accordingly, the electromagnet 67 becomes denergized causing the shutter of the shutter mechanism to be closed. That is, natural light mode photography is finished.

Next, when the shutter button is depressed with flash mode displayed, the contact 68 is closed and a voltage drop between the ends of the resistor 70 is produced to make conductive the thyristor 79 through the switch 77. As a result, the function of flash mode photography is selected. However, this operation of flash mode photography assumes that the opening and closing of the electric source of the flash device and control elements such as neon tubes meet the following requirements. In the case of a photographic flash device which is constituted in such a manner that the storage capacitor is charged up to a predetermined high voltage from low voltage source batteries through a DC—DC converter circuit comprising oscillating transistors, oscillating and boosting transformers and the like, the opening and closing of the source is performed not by opening and closing the direct circuit between the source and the flash device. Rather, this is accomplished by short-circuiting the base and emitter of an oscillating transistor by a transistor 86 to stop oscillation with no base current flowing and making transistor 86 non-conductive to start oscillation, these stops and starts of oscillation being equivalent in function to the opening and closing of the source. On the other hand, a control element 90 such as a neon tube is adapted to be conductive when the charged voltage of the storage capacitor reaches a voltage corresponding to a predetermined luminous intensity.

Consequently, since it is required before the flash device 106 begins operation that the transistor 86 be made conductive to keep the converter circuit from oscillating, the transistor 83 is made conductive by its base circuit being closed through a base resistor 84 so that the transistor 86 is provided with base current.

When the photographic flash device 106 is in the stopped state as described above, making the thyristor 79 conductive causes the base current of a transistor 82 to flow through resistors 88 and 89; that is, to be conductive through the resistor 65. As a result, a transistor 87 is made conductive to short-circuit the base and emitter of a transistor 83. Consequently, the transistor 83 is changed from the conductive state to the non-conductive state thereby reversing the transistor 86 to the non-conductive state thus causing the photographic flash device to operate. At the same time, the shutter mechanism which responds to the shutter button being pushed down is kept in a state in which the shutter can not be opened, because the base and emitter of the transistor 66 are short-circuited due to the transistor 82 and the thyristor 79 being conductive and accordingly the electromagnet 67 is denergized. When, thereafter, the storage capacitor of the flash device 106 is charged to reach a voltage value corresponding to a predetermined luminous intensity, the control element 90 such as a neon tube and accordingly a transistor 91 are made conductive thereby short-circuiting the base and emitter of the transistor 82. As a result, the transistor 82 is made non-conductive.

Thus, the transistor 66 is again made conductive through the resistor 65 causing the electromagnet 67 to be actuated; that is, the shutter of the shutter mechanism is made ready for opening and, further, the transistor 87 is made non-conductive and the transistors 83 and 86 are made conductive successively causing the storage capacitor of the flash device 106 to be prevented from charging. Still further, since a transistor 92 is also made conductive, when a switch 78 is short-circuited by further depressing the shutter button, the transistor 93 is made conductive and the transistor 73 is made non-conductive causing the electric source to stop supplying the photo-conductive element 74.

On the other hand, a transistor 94 is made conductive to form part of a time-constant circuit through a variable resistor 95.

Further, a circuit is provided for generating a triggering pulse to the flash device 106. This circuit comprises a transistor 96, the base circuit of which is short-circuited by a transistor 64 and is non-conductive, and is supplied from the source through a delay circuit 97 so as to prepare the transmission of the triggering signal.

When the shutter button is fully depressed after the above-described operation, the shutter of the shutter mechanism is opened and, at the same time, the switch 76 is opened to form the time-constant circuit comprising the variable resistor 95 and a capacitor 80. Therefore, when a time for flashing occurs which is suitable for the optimal aperture of the shutter corresponding to the distance to the object, the thyristor 71 is made conductive causing the transistors 59 and 64 to be non-conductive and, as the collector potential of the transistor 64 increases, the transistor 96 is made conductive through a differential circuit comprising a resistor 98 and a capacitor 99 thereby generating a triggering pulse signal across a resistor 100.

On the other hand, the electromagnet 67 is denergized due to the transistor 64 being non-conductive and closes the shutter after a mechanical response delay longer than the flashing time interval. Flash mode photography is thus finished.

The operation of flash mode photography as described so far is concerned with the case when the object is within the available range of flash mode photography which is determined by the luminous intensity of the flash device and the sensitivity of a film. When the object is outside the available range of flash mode photography, a switch 81 which is provided together with a focus adjusting ring is closed and, accordingly, a transistor 101 is made conductive by its base current flowing through a resistor 103 and the thyristor 79 so that a warning indicating that photography is impossible is displayed on a photodiode 102, and, at the same time, the transistor 86 is made conductive by providing it with base current thereby causing the flash device 106 to be incapable of starting oscillation.

The circuits 97 and 107 as enclosed by dashed lines in FIG. 3 are delay circuits and serve, together with a transistor 104, to prevent misoperations which may be performed while the storage capacitor of the flash device 106 is being charged with the shutter button fully depressed.

In addition, a switch 105 is adapted to be manually used, in particular, in slow-shutter conditions. When the switch 105 is opened, the function of the flash mode photography as described above is lost and a suitable aperture to a film as well as an object of low brightness is provided by setting a long opening interval. Then, a filter being interlocked with the switch 105 is provided together with the display lamp 69 so that a warning indicating slow-shutter photography may be displayed.

What we claim is:

1. The combination of a photographic camera and an electronic flash device, comprising:
   a first switch which is closed in response to a shutter release being depressed,
   a brightness detecting circuit connected to said first switch for detecting the brightness of an object,
   a switching circuit connected to said first switch,
   an electric power source and a storage capacitor comprising said electronic flash device, said power source and capacitor being coupled to said switching circuit,
   a voltage detecting circuit connected to said storage capacitor and said switching circuit for detecting the voltage across said storage capacitor,
   a second switch interlocked with a focus adjusting ring of said camera and connected to said switching circuit, said second switch being closed when said object is within a predetermined photographic range, and
   an electromagnet connected to said switching circuit and said second switch for enabling the shutter of said camera to be opened, said switching circuit actuating said electromagnet for enabling electronic flash photography when the brightness of the object is lower than a predetermined value, the object is within a predetermined photographic range and the voltage of said storage capacitor has reached a predetermined value.

2. The combination of a photographic camera and an electronic flash device as defined in claim 1, in which said switching circuit comprises a display means for displaying whether the object is within the effective range of said electronic flash device.

3. The combination of a photographic camera and an electronic flash device, said combination comprising:
- a first switch which is closed in response to a shutter release being pushed,
- a brightness detecting circuit connected to said first switch for detecting the brightness of an object,
- a switching circuit connected to said first switch,
- an electric power source and a storage capacitor comprising said electronic flash device, said power source and capacitor being coupled to said switching circuit,
- a voltage detecting circuit connected to said storage capacitor and said switching circuit for detecting the voltage across said storage capacitor,
- a second switch interlocked with a focus adjusting ring of said camera and connected to said switching circuit, said second switch being closed when said object is within a predetermined photographic range,
- an electromagnet connected to said switching circuit and said second switch for enabling the shutter of said camera to be opened, and
- a time constant circuit which includes a variable resistor interlocked with the rotation of said focus adjusting ring, said switching circuit actuating said electromagnet for opening the shutter and, after a predetermined time interval by means of said time constant circuit, flashing said electronic flash device when the brightness of the object is lower than a predetermined value, the object is within a predetermined photographic range and the voltage of said storage capacitor has reached a predetermined value.

4. The combination of a photographic camera and an electronic flash device as defined by claim 3, in which said brightness detecting circuit comprises a display means for displaying whether the use of said electronic flash device is required.

5. The combination of a photographic camera and an electronic flash device as defined in claim 3, in which said switching circuit comprises a display means for displaying whether the object is within the effective range of said electronic flash device.

6. A camera device having a photographic flash device combined therewith including automatic switching circuitry for automatically switching between daylight photography and electronic flash photography depending on film speed and the brightness of an object, said automatic switching circuitry comprising a first circuit which includes a photoconductive element for detecting the brightness of an object and determining shutter speed for daylight photography and a first transistor, and a second circuit which includes a variable resistor interlocked with a focus adjusting ring of said camera device and a second transistor, said first and second transistors being non-conductive and conductive, respectively, when the brightness of the object is lower than a predetermined value while said first and second transistors are made conductive and non-conductive, respectively, when the brightness of the object is higher than said predetermined value, thereby daylight photography and electronic flash photography being automatically switched depending on film speed and the brightness of said object.

* * * * *